United States Patent
Suneya

(10) Patent No.: US 8,503,444 B2
(45) Date of Patent: Aug. 6, 2013

(54) TRANSMISSION DEVICE, TRANSMISSION METHOD, AND PROGRAM FOR THE SAME

(75) Inventor: Toru Suneya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 12/700,617

(22) Filed: Feb. 4, 2010

(65) Prior Publication Data

US 2010/0202309 A1     Aug. 12, 2010

(30) Foreign Application Priority Data

Feb. 6, 2009   (JP) ................................ 2009-026377

(51) Int. Cl.
*H04L 12/26* (2006.01)

(52) U.S. Cl.
USPC ........... 370/389; 370/473; 370/474; 714/746; 714/776; 375/240.27

(58) Field of Classification Search
None
See application file for complete search history.

(56) References Cited

U.S. PATENT DOCUMENTS

| 7,668,712 B2 * | 2/2010 | Wang et al. ................... 704/219 |
| 2006/0029065 A1 * | 2/2006 | Fellman ........................ 370/389 |
| 2008/0109692 A1 * | 5/2008 | VerSteeg ...................... 714/746 |

FOREIGN PATENT DOCUMENTS

| JP | 2004-159042 A | 6/2004 |
| JP | 2005-347927 A | 12/2005 |
| WO | 02/17637 A | 2/2002 |
| WO | 02/17637 A1 | 2/2002 |
| WO | 2006/061902 A | 6/2006 |
| WO | 2006/061902 A1 | 6/2006 |

OTHER PUBLICATIONS

Philip A. Chou, et al., Error Control for Receiver-Driven Layered Multicastof Audio and Video, Multimedia, IEEE Transactions on Multimedia, vol. 3, No. 1, Mar. 2001, pp. 108-122.

J.Rosenberg, et al., An RTP Payload Format for Generic Forward Error Correction, Internet Draft, Dec. 1999, pp. 5-12, 22, "http://www.watersprings.org/pub/rfc/rfc2733.txt".

* cited by examiner

*Primary Examiner* — Min Jung
(74) *Attorney, Agent, or Firm* — Canon USA Inc IP Division

(57) ABSTRACT

A transmission apparatus is provided, including a combination determination unit configured to determine combinations of data packets so that when a data packet in a first frame is missed in transmission, a recover packet (FEC packet) for recovering the missing data packet is generated based on data packets in the first frame and data packets in a second frame, and an error correction coding unit configured to generate a recover packet based on the determination made by the combination determination unit.

19 Claims, 15 Drawing Sheets

«TRANSMISSION DEVICE, TRANSMISSION METHOD, AND PROGRAM FOR THE SAME»

BACKGROUND OF THE INVENTION

1. Field of the Invention

The present invention relates to a method of data transmission in wire or wireless network.

2. Description of the Related Art

Recently, the development of communication systems has enabled extensive transmission of moving image data which requires a relative wide communication band.

Moving image data is usually transmitted in real-time transport protocol (RTP) format, the RTP being a protocol designed for streaming real-time data such as voice and moving images.

When voice data or moving image data fails to be transmitted using RTP, for example, a technology called forward error correction (FEC) is used to recover the failed data in a receiving apparatus.

FEC is used to recover bit errors and lost packets that occur during data transmission, using error correction codes. A device for transmitting data generates redundant data by error correction coding of data to be transmitted, and transmits the redundant data with the data to be transmitted.

A device for receiving the data, when detecting an error and/or a lost packet in the received data, decodes the error correction codes using the data and the redundant data that are normally received, so that the packet sent in error is recovered.

Japanese Patent Application Laid-Open No. 2004-159042 discusses a method for recovering data packets that are lost in a communication path by a receiving apparatus based on redundant packets.

Not all of the lost packets, however, can be recovered by the redundant data.

For example, a plurality of data packets is generated using a single moving image frame, and a redundant packet (FEC packet) is generated for every four data packets that are successively transmitted. In transmission of the data packets and the FEC packets, if two or more packets out of the successive four data packets are lost, the lost packets cannot be recovered.

In most cases, such a loss of a plurality of packets in a short period of time cannot be recovered using redundant data.

SUMMARY OF THE INVENTION

The present invention is directed to reduce the number of lost data packets that cannot be recovered by redundant data.

According to an aspect of the present invention, a transmission apparatus configured to transmit data packets of moving image data to a receiving apparatus is provided, in which the data packets constitutes a plurality of frames of the divided moving image data. The transmission apparatus includes: a determination unit configured to determine a coding type which can decided whether a first frame of the plurality of frames is coded without reference to other frame data; a generation unit configured to generate a recover packet that is used, in cases where a data packet in the first frame is missed in transmission, by a receiving apparatus to recover the missing data packet, based on data packets in the first frame and data packets in a second frame having the same coding type as that of the first frame; and a transmission unit configured to transmit the data packets and the recover packet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
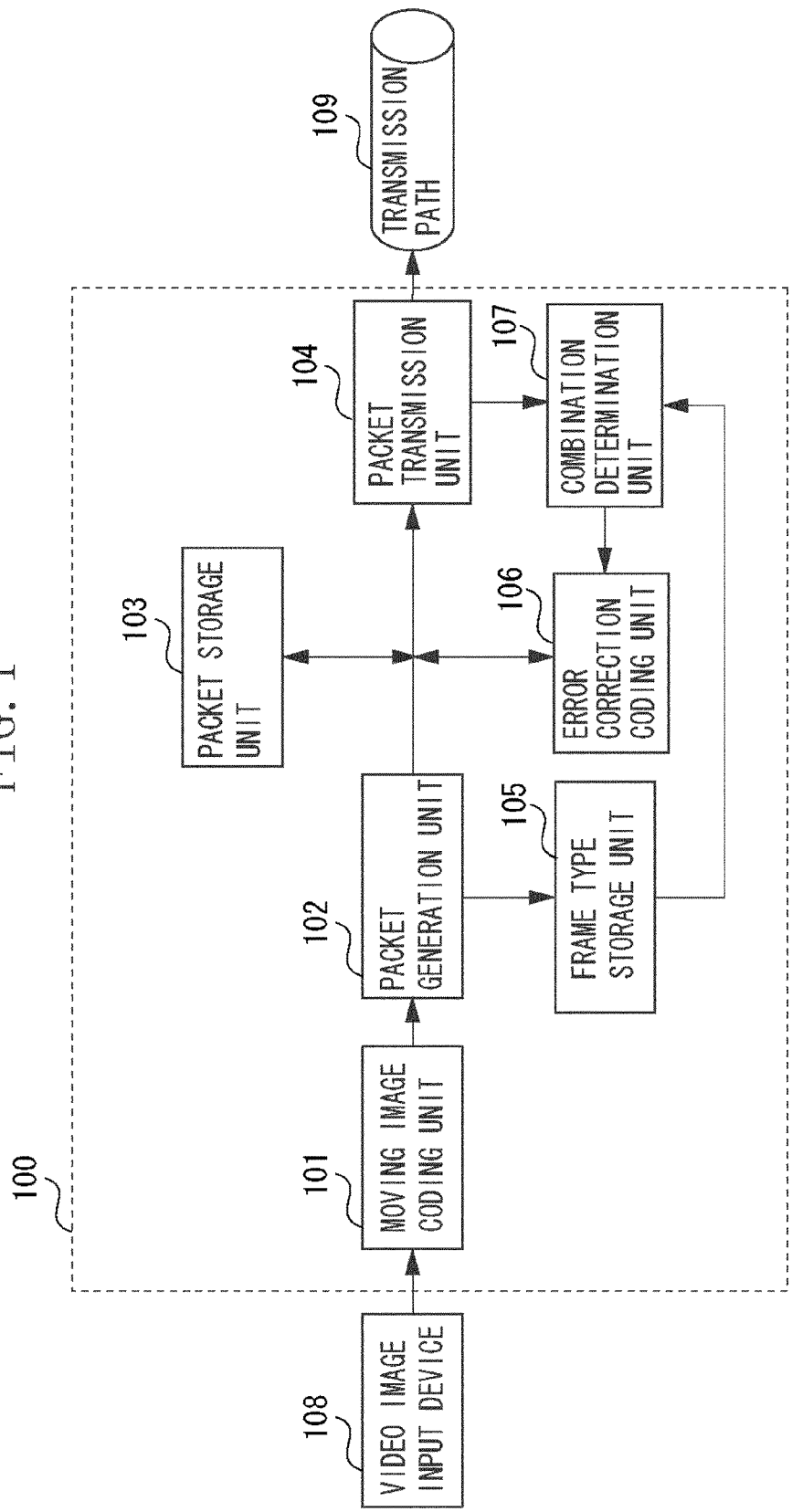
FIG. 1 is a block diagram illustrating a basic configuration of a transmission apparatus.

FIG. 1 is a block diagram illustrating a basic configuration of a transmission apparatus 100 according to an exemplary embodiment of the present invention.

The transmission apparatus 100 illustrated in FIG. 1 includes a moving image coding unit 101, a packet generation unit 102, a packet storage unit 103, a packet transmission unit 104, a frame type storage unit 105, an error correction coding unit 106, and a combination determination unit 107. In this exemplary embodiment, a video image input apparatus 108 and a transmission apparatus 100 are separately provided, but may also be configured as one unit. The transmission apparatus 100 is connected to a receiving apparatus (not illustrated) via the transmission path 109. The transmission path 109 represents various networks, and in this exemplary embodiment, is a network for transmitting packeted moving image data.

The moving image coding unit 101 compresses and codes moving image data input from an external video image input apparatus 108. The compressing and coding can be achieved using MPEG-2 (ISO/IEC 13818) or MPEG-4 (ISO/IEC 14496), for example. These coding standards mainly use the following three frame types in common:

(i) A first frame type in which information of a single frame is used for macro block coding. Compressed frames of this type are called intra-coded frames (I frames). The I frames are coded without reference to other frame data;

(ii) A second frame type refers to a frame backward in time and performs motion compensation prediction and macro block coding. Compression and coding of this type is achieved by reference to a previously reproduced frame, and compressed frames of this type are called predicted frames (P frames); and (iii) A third frame type refers to frames forward and backward in time and performs motion compensation prediction and macro block coding. Compression of this type is achieved by reference to a previously reproduced frame and a subsequently reproduced frame, and the compressed frames of this type are called bi-directional predicted frames (B frames). The P frames and B frames can be coded with reference to other frame data.

In MPEG-2, a plurality of coded frames is collectively called a group of pictures (GOP), whereas in MPEG-4, a plurality of coded frames is collectively called a group of video object plane (GOV). In this exemplary embodiment, a plurality of coded frames is collectively referred to as a GOP.

Generally, frames are also called pictures, but hereinafter referred to as frames.

Figure 2:
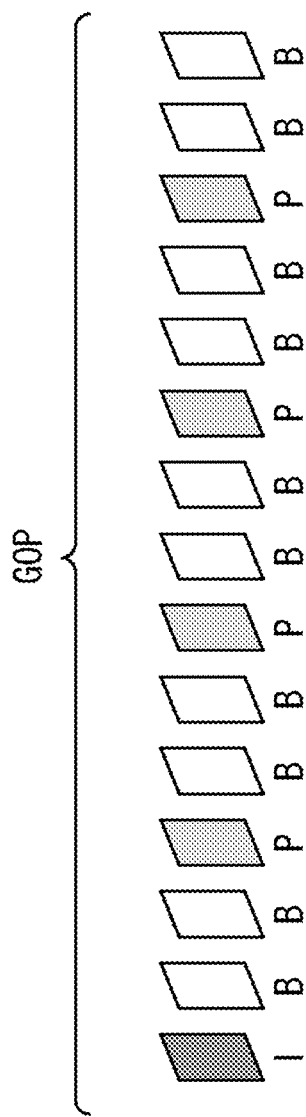
FIG. 2 illustrates a configuration of a group of pictures (GOP).

The moving image coding unit 101 in this exemplary embodiment encodes data in a GOP as illustrated in FIG. 2. In FIG. 2, the symbols I, P, and B each represent an I frame, a P frame, and a B frame. As illustrated, one GOP includes a plurality of frames of different frame types. A GOP in this exemplary embodiment includes one I frame, four P frames, and 10 B frames. The last B frame of the GOP in FIG. 2 is followed by an I frame of a next GOP. Each of GOPs constituting the moving image data in this exemplary embodiment has the same frame-type configuration.

The moving image coding unit 101 compresses moving image data input from the video image input apparatus 108 as described above for encoding, and outputs the encoded data to the packet generation unit 102.

The packet generation unit 102 packetizes the moving image data encoded by the moving image coding unit 101. More specifically, the packet generation unit 102 divides the encoded moving image data into a plurality of data segments of a size appropriate for communication, and attaches header information required for the communication to each data segment, so that data packets are generated.

The packet generation unit 102 stores the frame types of packetized moving image data (hereinafter, referred to as data packets) into the frame type storage unit 105 in association with identification information (e.g., sequence number) of each packet. The packet generation unit 102 also stores the data packets into the packet storage unit 103.

The frame type storage unit 105 stores the frame types therein in association with the identification information of each packet output from the packet generation unit 102. The frame type storage unit 105 outputs the identification information and the frame type of each packet to the combination determination unit 107.

The combination determination unit 107 determines a combination of data packets for error correction coding, based on the identification information and frame type of each packet output from the frame type storage unit 105 and the information of reception condition obtained from the transmission path 109. More specifically, based on the obtained reception condition, the combination determination unit 107 determines whether to generate an FEC packet using a combination of frame data segments that are not successive. The specific operation of the combination determination unit 107 will be described later.

The error correction coding unit 106 generates packets for error correction (hereinafter, referred to as FEC packets) based on the combination of data packets determined by the combination determination unit 107. The FEC packets are used by a receiving apparatus to recover data packets that are lost during transmission. The receiving apparatus configured to receive data packets in this exemplary embodiment is able to recover the lost data packets based on normally transmitted FEC packets and normally transmitted data packets.

The typical error correction coding uses parity (XOR) code, BCH code, and Reed-Solomon code. In this exemplary embodiment, parity code is used to generate FEC packets, but the error correction code to be used is not limited to parity code and may be other code including those listed above.

The error correction coding unit 106 in this exemplary embodiment can generate FEC packets based on data packets of the frames from different GOPs. The error correction coding unit 106 also generates FEC packets so that the FEC packets each include a header having the corresponding identification information that was used to generate the FEC packets.

The identification information of a data packet in this exemplary embodiment includes a sequence number of the data packets, and the difference between sequence numbers of the data packet and another data packet. This allows a receiving apparatus to refer to the header of each FEC packet to determine the FEC packets and data packets used to recover data packets that are missed during transmission.

The error correction coding unit 106 stores the generated FEC packets into the packet storage unit 103. The error correction coding unit 106, however, may transmit the generated FEC packets to a receiving apparatus, instead of storing.

The packet transmission unit 104 transmits the data packets and FEC packet stored in the packet storage unit 103 to a receiving apparatus via the transmission path 109. Thus, the transmission apparatus 100 in this exemplary embodiment transmits the data packets of moving image data that are obtained by dividing each of the plurality of frames to a receiving apparatus. The packet transmission unit 104 also has a function to receive the packets transmitted to the transmission apparatus 100 via the transmission path 109. For example, the packet transmission unit 104 receives a packet (receiver report) that notifies a transmission apparatus of the information indicating reception condition of a receiving apparatus.

Figure 3:
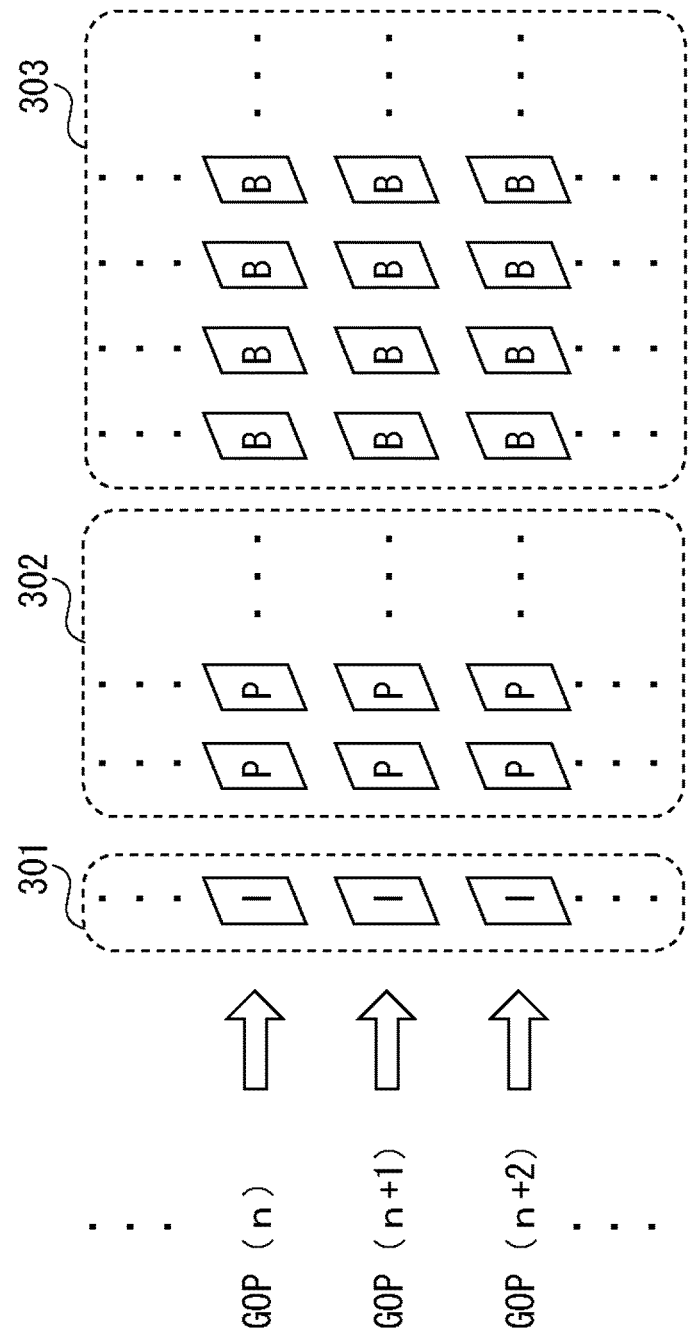
FIG. 3 illustrates an operation of a combination determination unit.

The operations for combination control by combination determination unit 107 will be described briefly below with reference to FIG. 3. In FIG. 3, a GOP (n) represents an $n^{th}$ GOP. The GOP (n), a GOP (n+1), and GOP (n+2) are successively reproduced in time. A first frame (I frame) of the GOP (n+1) is reproduced after the last frame of the GOP (n). In FIG. 3, each GOP is illustrated with frames that are grouped according to frame types.

In this exemplary embodiment, each GOP includes three frame types: an I frame group 301, a P frame group 302, and a B frame group 303.

The combination determination unit 107 determines a combination of data packets chosen from each group of frame type to generate FEC packets. In other words, the combination determination unit 107 determines combinations of the data packets by combining the data packets included in the I frame group 301 so that an FEC packet for data packets in the I frame is generated. The combination determination unit 107 also determines combinations of data packets by combining the data packets included in the P frame group 302 so that an FEC packet for data packets in the P frame is generated. The determination is similarly made for the B frame group 303. Accordingly, the error correction coding unit 106 generates FEC packets based on the combinations of the data packets from each group of the above frame types.

As described above, the error correction coding unit 106 in this exemplary embodiment determines a combination of data of an identical frame type from different GOPs for error correction coding, to generate FEC packets. Such generation of FEC packets based on a combination of frames of an identical frame type facilitates changing of the redundancy of the FEC packets according to the frame type. For example, an FEC packet from I frames may have a higher-level redundancy than those of FEC packets from P frames and B frames.

The combination determination unit 107 in this exemplary embodiment determines a combination of data packets of an identical frame type from different GOPs for error correction coding, to generate FEC packets. Alternatively, for example, FEC packets may be generated from data packets in different frames, which reduces the data packets that are lost and not recovered by redundant data (FEC packet). Furthermore, for example, FEC packets from I frames may be generated by a combination of I frames from different GOPs, and other FEC packets may be generated by a combination of B and P frames from an identical GOP.

A header configuration of an FEC packet specified at RFC 5109 by IETF will be described below.

Figure 4:
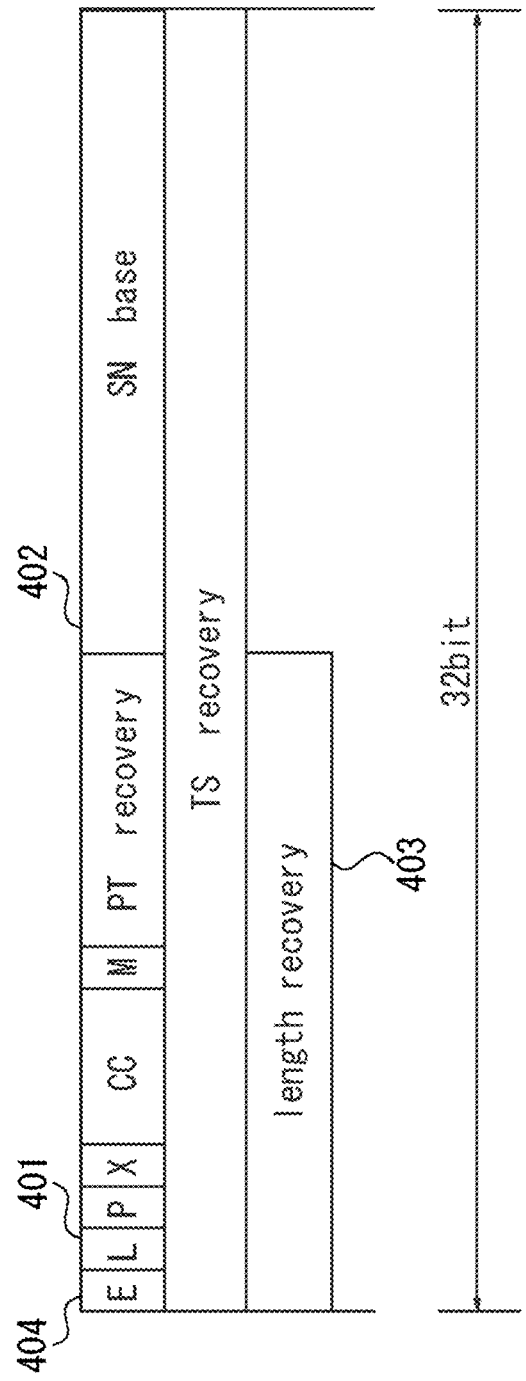
FIG. 4 illustrates a header format of an FEC packet.

FIG. 4 illustrates a format of a header of an FEC packet. The "L" bit 401 is a one-bit flag that specifies an effective bit length of the length recovery 403: when the "L" bit 401 is not set (0), the length recovery 403 is 16 bits long; when the "L" bit 401 is set (1), the length recovery 403 is 48 bits long.

The "SN base" field 402 is 16 bits long, and stores the smallest sequence number of the data packet (data packet A) among the plurality of data packets recoverable by the FEC packet. In other words, the "SN base" field 402 records the sequence number of the data packet that is reproduced first among the plurality of data packets corresponding to the FEC packet.

The "length recovery" field 403 indicates the data packet members recoverable by the FEC packet. The "length recovery" field 403 indicates information for identifying a plurality of data packets corresponding to the FEC packet.

The first bit of the "length recovery" field 403 indicates the data packet (data packet A) stored in the "SN base" field 402 The second bit in the "length recovery" field 403 indicates the data packet having a sequence number subsequent to the sequence number of the data packet stored in the "SN base" field 402. In other words, the "length recovery" field 403 can indicate data packet members having successive sequence numbers, up to 48 packets.

The data packets at the bits that are set (1) in the "length recovery" field 403 are the members used to generate the FEC packet. For example, the "length recovery" field 403 having three first bits that are set (1) and the other bits set (0), indicates that the FEC packet is generated by the data packets composed of the data packet having the sequence number stored in the "SN base" field 402 and the two data packet having the next two sequence numbers. In other words, the data packets at the bits that are set (1) in the "length recovery" field 403 can be recovered using the FEC packet and the other data packet members.

As described above, the FEC packet header contains a field of a plurality of bits (48 bits), and each of the bits corresponds to each of data packets having successive sequence numbers, so that the data packets used in the generation of the FEC are indicated. Thus, a receiving apparatus can decide FEC packet members. However, the data packets having sequence numbers separated by more than the bit number of the "length recovery" field 403 (e.g., 48 bits) cannot be used to generate the FEC packet.

Therefore, in this exemplary embodiment, an FEC packet header is modified, so that the data packets having sequence numbers separated by more than the bit number of the "length recovery" field 403 can be used to generate an FEC packet.

Figure 5:
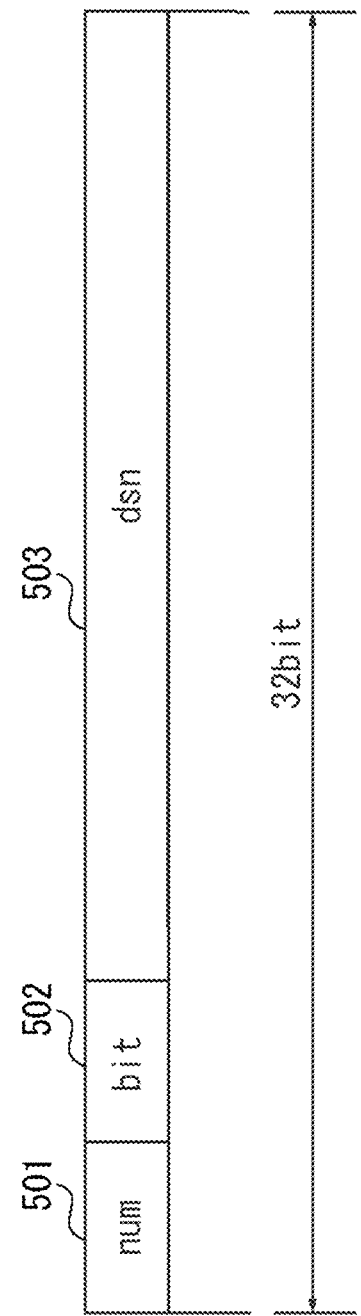
FIG. 5 is illustrates an extended header of an FEC packet.

FIG. 5 illustrates an extended field of an FEC packet header. In this exemplary embodiment, an extended field which is effective when the flag field of the "E" bit 404 in FIG. 4 is set (1) will be described below.

In FIG. 5, the "num" field 501 is a variable with four-bit width, and indicates the number of data packets that are used to generate the FEC packet except the data packet (data packets A) in the "SN base" field 402. For example, in cases where one FEC packet is generated by three data packets, the "num" field 501 records "0010".

The "bit" field 502 is a variable with four-bit width, and indicates a bit width to record the difference in the sequence numbers between a plurality of data packet members used to generate the FEC packet. For example, in cases where the maximum difference between the sequence numbers of a plurality of data packet members used to generate the FEC packet can be represented by 12 bits, the "bit" field 502 records "1100".

The "dsn" field 503 is a variable with a variable bit width that is obtained by multiplying the value in the "num" field 501 by the value in the "bit" field 502. The "dsn" field 503 records the difference in sequence numbers between the data packet A and each of the sequence numbers of the members except the data packet A. For example, in generating one FEC packet from three data packets, in a case where the difference of sequence number between the data packet A and each of the other members is 12 bits, the "dsn" field 503 consists of 24 bits.

The field of a bid width indicated in the "bit" field 502 (e.g., 12 bits) counting from the first bit of the "dsn" field 503 represents the difference in sequence numbers between the data packet A and B. The sequence number of the data packets A is recorded in the "SN base" field 402. The data packets B is a data packet having the smallest sequence number among the data packets used to generate the FEC packet except the data packet A.

Similarly, the field of the bit width indicated in the "bit" field 502 counting from the next bit of the "dsn" field 503 represents the difference in sequence numbers between the data packet A and C. The data packet C has the smallest sequence number next to the data packet A among the data packets used to generate the FEC packet. In other words, the "dsn" field 503 in the FEC packet header records the difference in the sequence numbers between the data packets A and B having the two smallest sequence numbers among the data packets used to generate the FEC packet. The "dsn" field 503 further records the difference in sequence numbers between the data packets A and the data packet C having the small sequence number next to the data packet B.

Figure 6:
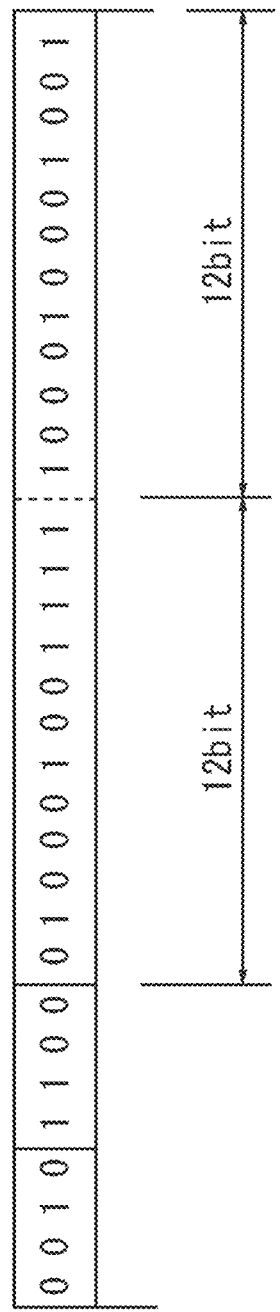
FIG. 6 illustrates data recorded in the extended header of an FEC packet.

FIG. 6 illustrates an example of data recorded in an extended field of a heater of an FEC packet in this exemplary embodiment.

The example is based on the following values: a bit rate of moving image data is about 20 Mbps, a period of time of a GOP is 0.5 sec, an average size of a data packet is 1200 bites, and the number of the members for the FEC packet is three.

In FIG. 6, the "num" field 501 represents the value two for the number of data packet members for the FEC packet. This means the first data packet (data packet A) corresponding to the "SN base" field 402 and the other two data packets were used to generate the FEC packet.

The "bit" field 502 represents the value 12. The difference (identification information of the data packets B) in sequence numbers between the data packets A and B, and the difference (identification information of the data packets C) in sequence numbers between the data packets A and C are each represented using 12 bits.

The first 12 bits in the "dsn" field 503 in FIG. 6 indicates that the difference in sequence numbers between the data packets A and B is "010001001111", that is 1103. Similarly, the second 12 bits in the "dsn" field 503 indicates that the difference in sequence numbers between the data packets A and C is "100010001001", that is 2185.

As described above, the data packets A has the smallest sequence number among the plurality of data packets used to generate the corresponding FEC packet. The data packets B has the smallest sequence number next to the data packets A, whereas the data packets C has the smallest sequence number next to the data packets B.

In this exemplary embodiment, one FEC packet is generated using three data packets, but the present invention is not limited to the number.

Figure 7:
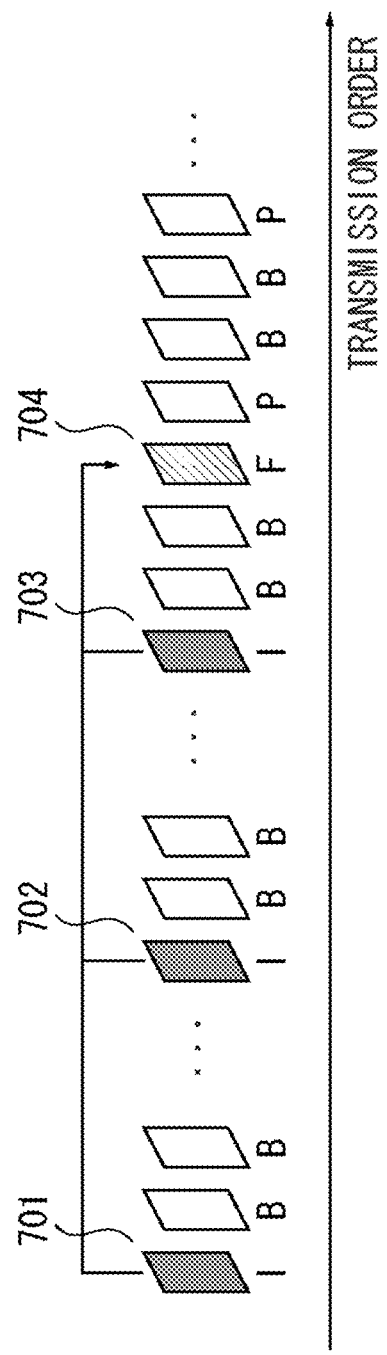
FIG. 7 illustrates generation and transmission order of FEC packets.

FIG. 7 schematically illustrates the generation and transmission of an FEC packet using a combination of I frames at the head position in three successive GOPs. The "SN base" field 402 in an FEC packet 704 records the sequence number of one data packet used to generate the FEC packet 704 among the data packets of an I frame 701 in FIG. 7. The FEC packet in this exemplary embodiment is generated using data packets of a plurality of frames, but the data packet in the I frame 701 that is reproduced first is recorded in the "SN base" field 402. The data packet in the I frame 702 corresponds to the above data packet B. Similarly, the data packet in the I frame 703 corresponds to the above data packet C.

Herein, a group of FEC packets generated using the data packets constituting the three I frames 701 to 703 is referred to as an "FEC frame" for convenience. The packet transmission unit 104 in this exemplary embodiment transmits the FEC frame 704 two to three frames later than the I frame 703 as illustrated in FIG. 7. The interval between the I frame 703 and the FEC frame 704 reduces the possibility to miss both of the I frame 703 and the FEC frame 704 due to errors that successively occur. The transmission order of the FEC frame 704, however, is not limited to that illustrated in FIG. 7.

A specific operation for generating FEC packets will be described below with reference to FIGS. 8 and 9.

Figure 8:
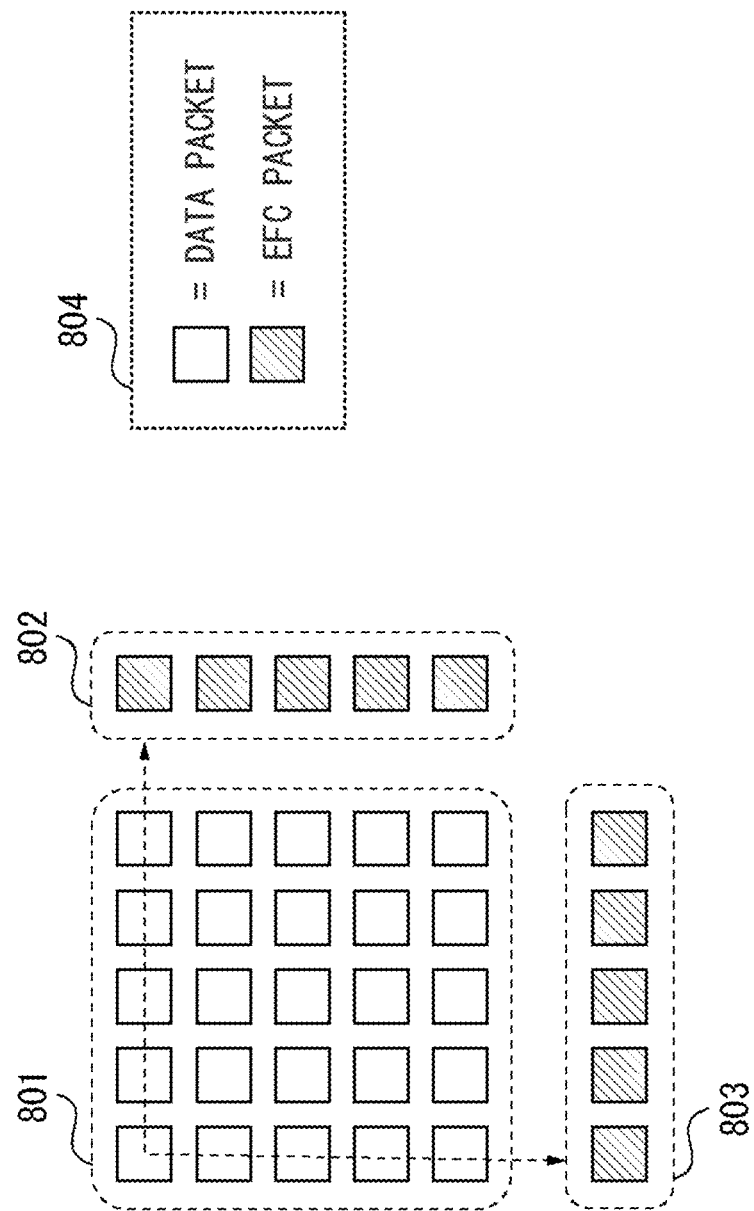
FIG. 8 illustrates generation of FEC data using data packets in a GOP.

FIG. 8 illustrates an operation for generating FEC packets using a plurality of data packets in a single frame.

In FIG. 8, as noted in the box 804, the white squares represent data packets, and the shadowed squares represent FEC packets. The data packet group 801 includes data packets arranged in a matrix in one frame. The data packet group 801, however, may include data packets in which a plurality of frames is adjacently located in the transmission order.

The FEC packets 802 contain the redundant data generated using a combination of the packets in the horizontal direction of the data packet group 801. The FEC packets 803 contain the redundant data generated using a combination of the packets in the vertical direction of the data packet group 801.

An operation in this exemplary embodiment for generating FEC packets using data packets of a plurality of frames will be described with reference to FIG. 9.

Figure 9:
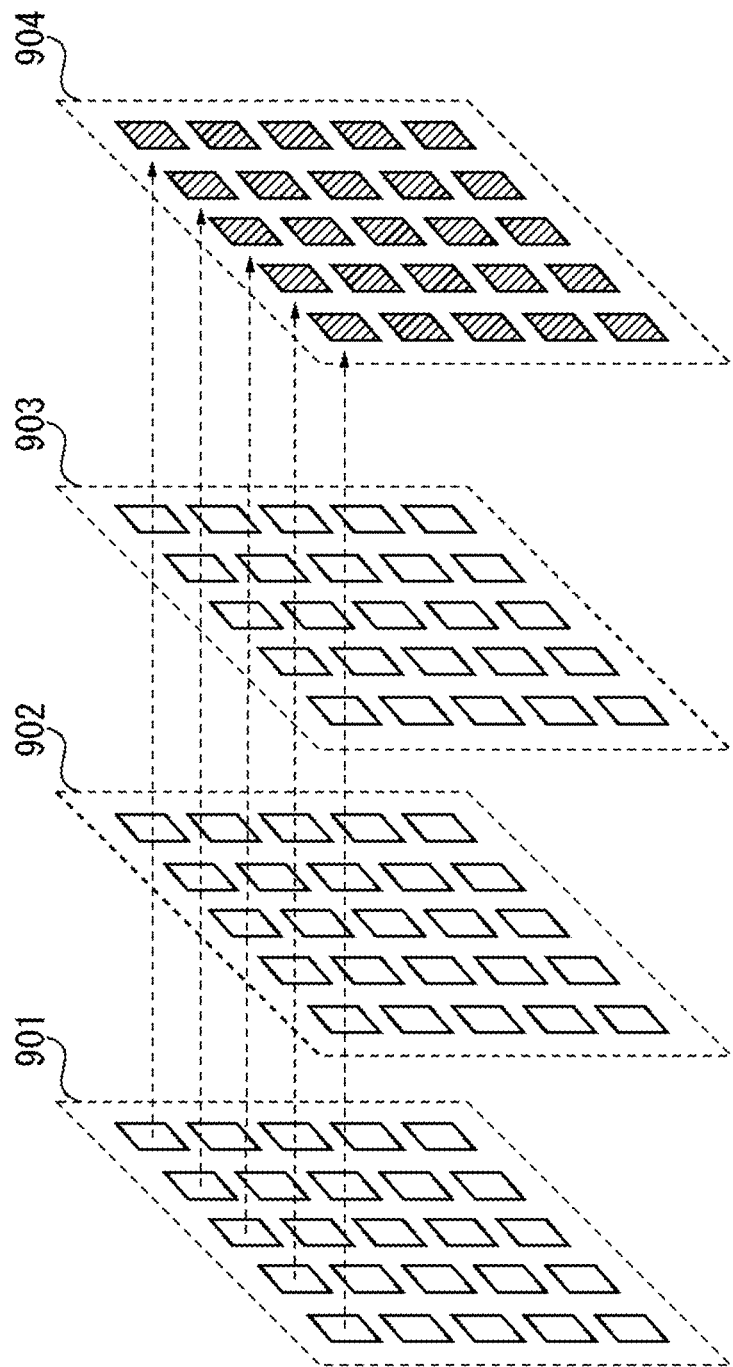
FIG. 9 illustrates generation of FEC data using data packets in different GOPs.

In FIG. 9, a data packet group 901, a data packet group 902, and a data packet group 903 are frames belonging to different GOPs. For example, the data packet group 901 corresponds to the data packets in the I frame 701 in FIG. 7. Similarly, the data packet group 902 corresponds to the data packets in the I frame 702 in FIG. 7, whereas the data packet group 903 corresponds to the data packets in the I frame 703 in FIG. 7. The data packet group 904 corresponds to the FEC frame 704 in FIG. 7. The FEC packets constituting the FEC packet group 904 are each generated using a combination of the data packets in the data packet group 901 to 903 in the time direction. In other words, each FEC packet in the FEC packet group 904 is generated using a combination of the data packets in the frames from different GOPs.

The error correction coding unit 106 in this exemplary embodiment generates FEC packets using a combination of data packets in the data packet group 903 corresponding to the display positions of the data packets in the data packet group 902, as illustrated in FIG. 9. In FIG. 9, for example, the error correction coding unit 106 generates the FEC packet at the right upper position in the FEC packet group 904 based on the data packets at the right upper position in each of the data packet groups 902 to 904. The FEC packet at the right upper position is used to recover the data packets at the right upper position in each of the data packet groups 902 to 904 in case of missing of these packets. Thus, the error correction coding unit 106 generates the recover packet for the first data packet at the right upper position (first position) in the I frame 702 based on the first data packet, and the second data packet corresponding to the right upper position in the I frame 703.

Figure 10:
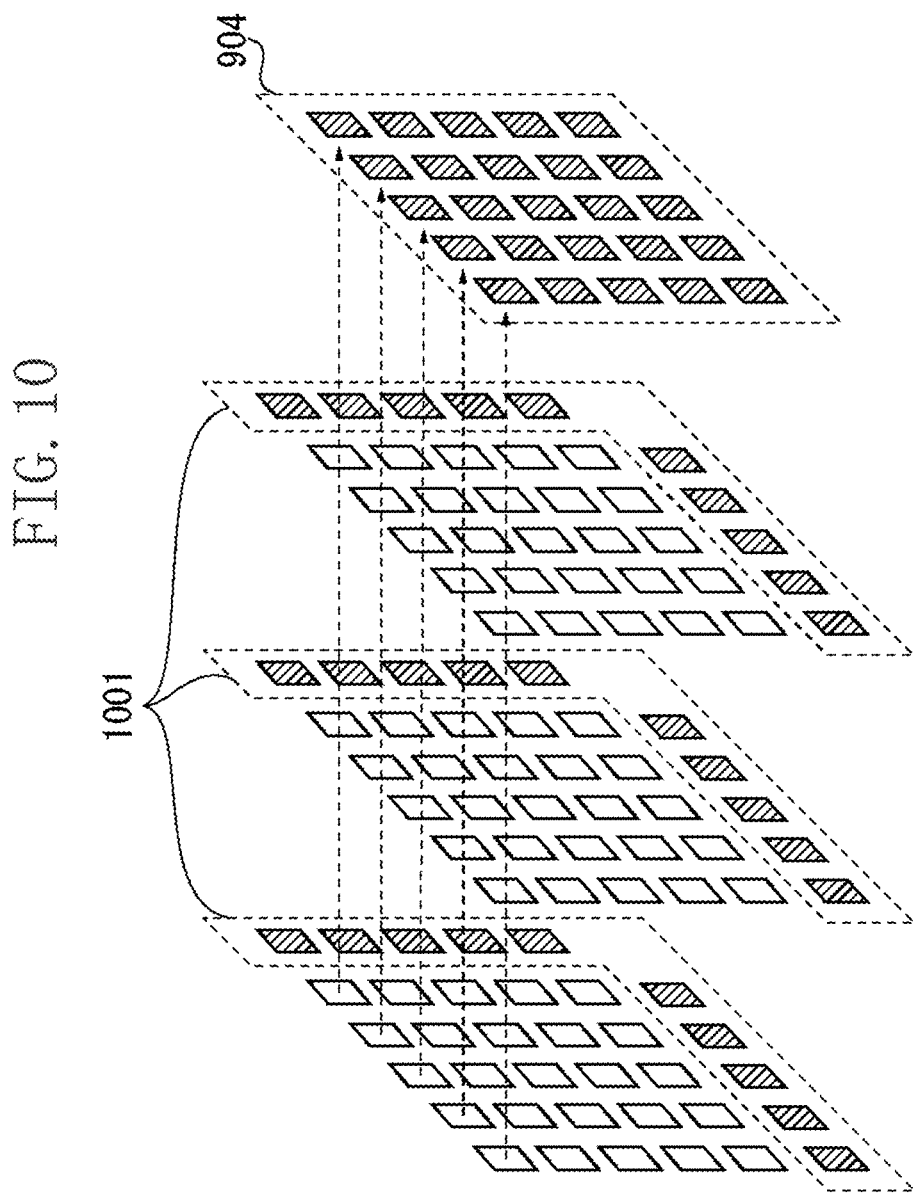
FIG. 10 illustrates FEC packets generated by a transmission apparatus.

The error correction coding unit 106 in this exemplary embodiment generates, as illustrated in FIG. 10, FEC packet groups 1001 based on data packets in one frame, and also an FEC packet group 904 based on data packets from different GOPs. FIG. 10 illustrates a plurality of FEC packet groups 1001 in a plurality of frames, the FEC packet groups being generated according to the operation in FIG. 8 for the FEC packets 802 and 803.

The FEC packet groups 1001 each contains the FEC packets generated using a combination of data packets in the data packet groups in the horizontal direction and the FEC packets generated using a combination of data packets in the data packet groups in the vertical direction of the frame. As described with reference to FIG. 8, each data packet group may, for example, contain the data packets in one frame or the data packets across two adjacent frames.

As described above, when both of the FEC packet groups 1001 and the FEC packet group 904 are used, a recovery rate is further increased. Alternatively, only the FEC packets generated using data packets from different GOPs may be used.

The error correction coding unit 106 can generate FEC packets using a combination of data packets in a plurality of frames adjacent in the transmission order, instead of using a combination of data packets in a single frame, as described above.

In the case that an FEC packet is generated using a combination of data packets in a plurality of frames that are separated by a time interval, the timing when the FEC packet is required for recovery comes into question.

Depending on the time when the FEC packet required for recovery of lost data packets is received, the recovery of the lost data packets may be late for the time the data packets should be reproduced. For example, in cases where the data in the FEC frame 704 is used to recover the lost data packets in the I frame 701 in FIG. 7, if the FEC frame 704 is received later than the time of the reproduction time of the I frame 701, the lost data packets cannot be recovered before the reproduction time.

Therefore, the combination determination unit 107 in this exemplary embodiment determines the members of FEC frames so that each frame is contained in at least one FEC frame as the last member thereof. More specifically, the combination determination unit 107 in this exemplary embodiment determines the members of FEC frames so that a predetermined frame (frame A) belongs to a plurality of FEC frames. In addition, the combination determination unit 107 determines the members of FEC frames so that the frame A is reproduced last in the reproduction order in at least one FEC frame. Thus, when the data packets in the frame A are missed, an FEC frame (FEC frame A) having the frame A as the last member can be used in recovering the data packets in frame A. The other members of the FEC frame A that are the data packets in GOPs reproduced before the frame A have been already transmitted to a receiving apparatus.

For example, the I frame 701 in FIG. 7 is a member of the FEC frame 704. The I frame 701 is reproduced first in the reproduction order among the members (I frames 701, 702, 703) of the FEC frame 704. Furthermore, the I frame 701 is a member of another FEC frame that is reproduced using a combination of the FEC frame 704 and an I frame transmitted before the I frame 701.

The combination determination unit 107 determines the members used to generate FEC frames so that the I frame 701 is contained in at least one FEC frame as the last member thereof among the other FEC frames.

The FEC frame in this exemplary embodiment is transmitted two or three frames later than the I frame that is the last member of the FEC frame. Accordingly, for example, when data packets in the I frame 701 are missed successively in transmission, recovery of the lost data packets are tried first using the FEC frame transmitted two or three frames later than the I frame 701. In other words, the data packets in the FEC frame that includes the I frame 701 as the last member and other members are used to recover the lost data packets. If the receiving apparatus then determines that the recovery is possible, the lost data packets in the I frame 701 can be recovered using the FEC packet two or three frames later than the I frame 701.

This reduces the time required for the recovery of the lost data packets in the I frame 701, as compared to the recovery using the FEC frame 704, which will be described later with reference to FIG. 11.

As described above, the combination determination unit 107 in this exemplary embodiment determines the members of the FEC frames so that a data packet of each frame is contained in at least one FEC frame as the last member thereof. Alternatively, the combination determination unit 107 may determine the members of the FEC frames so that a part of frames is contained in at least one FEC packet as the last members thereof. For example, the combination determination unit 107 may determine the members of the FEC frames so that the I frame is contained in at least one FEC frame as the last member thereof.

Furthermore, for example, the combination determination unit 107 may determine the members of the FEC frames so that the frame that is determined to be more important based on the data amount per frame and the motion vector size thereof is contained in at least one FEC packet as the last member thereof. This reduces the time required for the recovery of the missing data packets in the I frame or other important frames after the detection of the missing. This also reduces the number of FEC packets as compared to the case where the FEC frames are generated so that each frame is contained in at least one FEC frame as the last member thereof.

Figure 11:
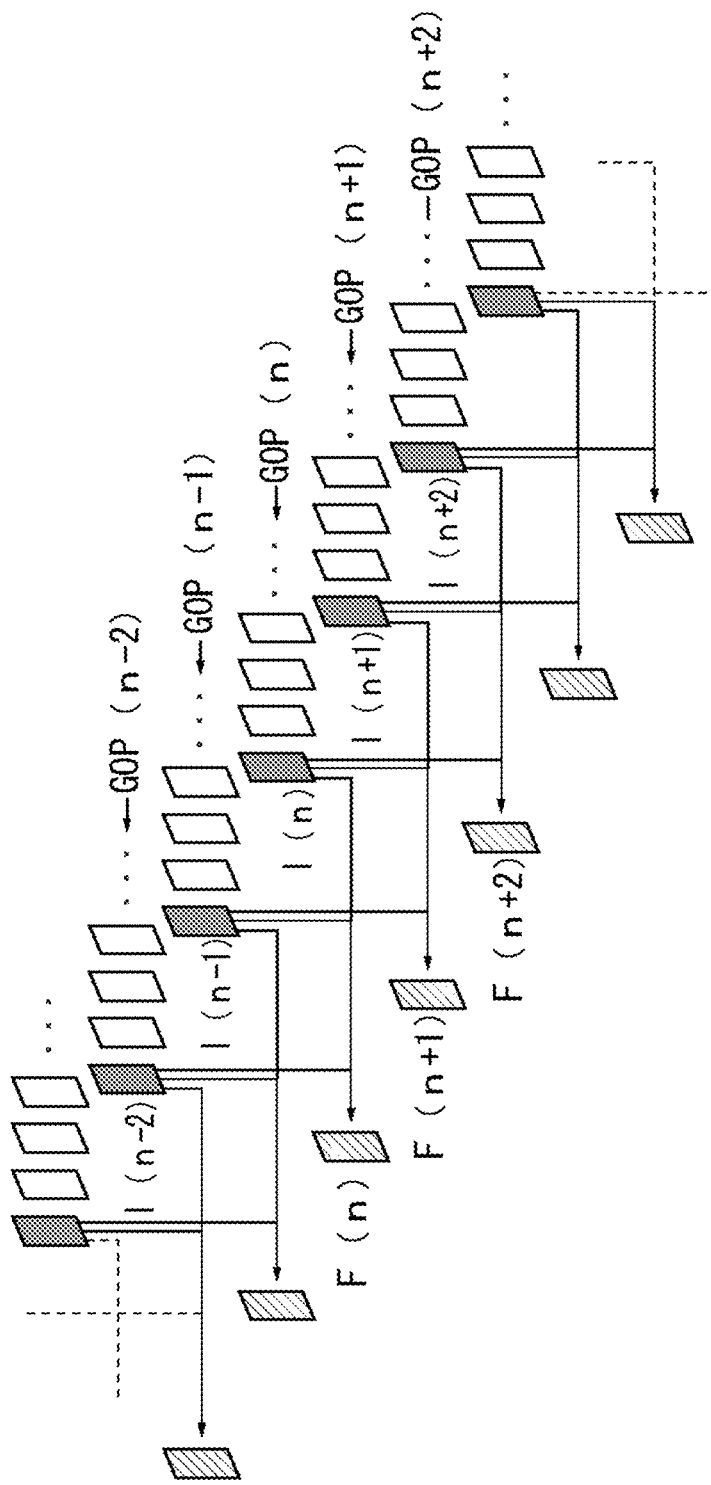
FIG. 11 illustrates a pattern for generating FEC packets.

FIG. 11 illustrates an example of combinations of I frames for generation of FEC frames so that the I frame from each GOP is contained in at least one FEC frame as the last member thereof.

The GOPs in FIG. 11 are reproduced successively. For example, the GOP (n−1) is reproduced after the GOP (n−2), and then a GOP (n) is reproduced.

The combination determination unit 107 determines combinations of data packets so that each FEC frame is generated using a combination of frames from different GOPs. For example, an FEC frame F (n) is generated to contain the members including an I frame I (n−2) at the head position of the GOP (n−2), an I frame I (n−1) at the head position of the GOP (n−1), and an I frame I (n) at the head position of the GOP (n).

An FEC frame F (n+1) is generated to contain the members including an I frame I (n−1) at the head position of the GOP (n−1), an I frame I (n) at the head position of the GOP (n), and an I frame I (n+1) at the head position of the GOP (n+1). An FEC frame F (n+2) is generated to contain the members including an I frame I (n) at the head position of the GOP (n), and an I frame I (n+1) at the head position of the GOP (n+1), and an I frame I (n+2) at the head position of the GOP (n+2).

The I frame I (n) is contained in the FEC frame (n) as the last member thereof. The I frame I (n+1) is the last member in the FEC frame (n+1), and the I frame I (n+2) is the last member in the FEC frame (n+2). It is the same with the other I frames.

FIG. 11 illustrates only the FEC frames for I frames, but the error correction coding unit 106 can generate FEC frames with B and I frames in the manner similar to that for I frames.

From a viewpoint of the I frames, for example, the I frame I (n) in the GOP (n) is a member of the FEC frame F(n), like the I frame I (n−1) of the GOP (n−1) and the I frame I (n−1) in the GOP (n−1). At the same time, the I frame I (n) in the GOP (n) is a member of the FEC frame F (n+1) and the FEC frame F (n+2). The I frame I (n) in the GOP (n) is used to generate the FEC frame F (n), the FEC frame F (n+1), and the FEC frame F (n+2).

Thus, the error correction coding unit 106 generates a recover packet (FEC frame F (n+1)) for recovering missing data packets in a first frame (I frame I (n)), based on the data packets in the first frame, a second frame (I frame I (n+1)), and the I frame I (n−1).

The error correction coding unit 106 also generates a recover packet (FEC frame F (n+2)) for recovering missing data packets in the second frame, based on the data packets in the second frame, a third frame (I frame I (n+2)), and the I frame I (n). The first to third frames are input from the moving image coding unit 101.

The first to third frames are reproduced in this order.

In this exemplary embodiment, the FEC frame F (n) generated in FIG. 11 is transmitted two or three frames later than the I frame I (n) that is transmitted last among the plurality of frames (I frames I (n−2), I (n−1), and I (n)) used in generating the frame. Similarly, the FEC frame F (n+1) is transmitted two or three frames later than the I frame I (n+1). The FEC frame (n+2) is transmitted two or three frames later than the I frame I (n+2).

As described above with reference to FIG. 7, for example, when the data packets in the I frame I (n) are lost, the receiving apparatus can use the FEC frame F (n) containing the I frame I (n) as the last member to recover the lost data packets. In the case that the lost data packets could not be recovered using the FEC frame F (n), the receiving apparatus can use the FEC frame F (n+1) for the recovery of the lost data packets. The FEC frame F (n+1) is transmitted two or three frames later than the I frame (n+1). Furthermore, if the lost data packets in the I frame I (n) cannot be recovered using the FEC frame F (n+1), the receiving apparatus can use the FEC frame F (n+2) for the recovery of the lost data packets. The FEC frame F (n+2) is transmitted two or three frames later than the I frame (n+2).

As described above, the combination determination unit 107 in this exemplary embodiment determines combinations of frames that are used to generate FEC frames so that each frame data is used in a plurality of FEC frames. The combination determination unit 107 determines combinations of frames that are used to generate FEC frames so that all of the frames are each contained in at least one FEC frame as the last member thereof.

Next, an example of data decoded by an error correction decoding in this exemplary embodiment will be described with reference to FIG. 12.

Figure 12:
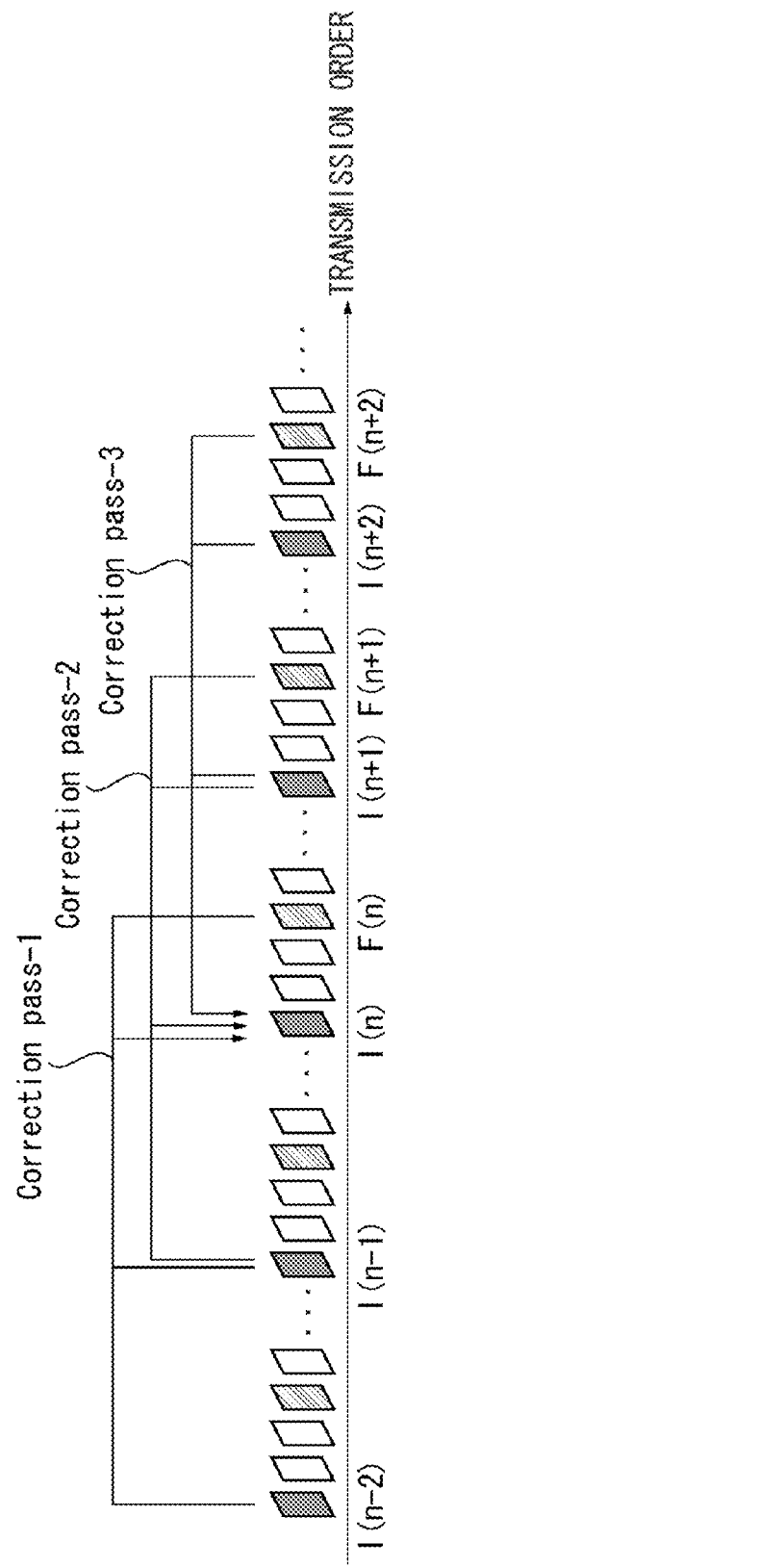
FIG. 12 illustrates a pattern for generating FEC packets, and transmission order of the FEC packets.

FIG. 12 illustrates a transmission order of the data frames and FEC frames in FIG. 11. Each FEC frame in this exemplary embodiment is transmitted three frames later than the last member frame, although the order is not limited to this.

In FIG. 12, in cases where the data packets in the I frame I (n) are lost, the error correction recovers the data packets via a Correction Pass-1, a Correction Pass-2, or a Correction Pass-3. The Correction Pass-1 uses the FEC packet in the FEC frame (FEC frame F (n)) containing the I frame I (n) as the last member to recover the lost data packets in the I frame I (n). If the data can be recovered via the Correction Pass-1, the period of time between the detection of the missing in the transmission and the recovery can be significantly reduced.

If the data cannot be recovered via the Correction Pass-1 and a delay time is allowed, the receiving apparatus can use the Correction Pass-2 and the Correction Pass-3 for the recovery. The data packets cannot be recovered via the Correction Pass-1, for example, in cases where the data packets in the frames (I frame I (n−2) and I frame I (n−1)) other than the I frame I (n) are missed in transmission, or where the FEC packet is missed in transmission.

In the above description, one FEC frame is generated using frames from three GOPs. The combination determination unit 107 in this exemplary embodiment, however, determines combinations of data packets for generation of FEC packets, based on, for example, buffer capacity, allowable delay time, and burst error of a receiving apparatus.

For example, the combination determination unit 107 decreases the number of the FEC packet members to less than three if the time of the recovery of lost data packets in the I frame I (n) via the Correction Pass-3 is too late for the reproduction time of the lost data packets.

Alternatively, for example, the combination determination unit 107 can generate FEC packets using the data packets from further separated GOPs if an allowable delay time is long enough.

In other words, the combination determination unit 107 determines the combinations of data packets for generation of FEC packets based on the difference between the transmission time and the reproduction time of the data packets.

Accordingly, in cases where the difference between the transmission time and the reproduction time of the data packets in the first frame (the I frame in the GOP (n)) is a first time (e.g., 700 msec), the error correction coding unit 106 generates recover packets as follows. The error correction coding unit 106 generates recover packets used to recover the data packets in the first frame based on the data packets in the first frame (the I frame in the GOP (n)) and the data packets in a second frame (the I frame in the GOP (n+1)).

In contrast, in cases where the difference between the transmission time and the reproduction time of the data packets in the first frame is a second time (e.g., 2000 msec) which is longer than the first time, the error correction coding unit 106 generates recover packets as follows. The error correction coding unit 106 generates recover packets used to recover the data packets in the first frame based on the data packets in the first frame and the data packets in a third frame (the I frame in the GOP (n+2)).

The first to third frames are input from the moving image coding unit 101.

The first to third frames are reproduced in this order.

The combination determination unit 107 reduces the number of frames used to generate FEC frames, in cases where a receiving apparatus has a small buffer capacity for data packets. For example, a receiving apparatus that can hold only data packets from two GOPs cannot recover data packets using the FEC packets generated based on the data packets from three different GOPs as illustrated in FIG. 12. In this case, the combination determination unit 107 reduces the number of frames that are used to generate FEC frames according to the buffer capacity of the receiving apparatus. In this way, the combination determination unit 107 determines the number of frames used to generate FEC frames according to the buffer capacity of a receiving apparatus.

As a result of such a reduction in the number of frames used to generate FEC frames according to the buffer capacity and allowable delay time of a receiving apparatus, the generation and transmission of FEC packets that are useless in the recovery of lost data packets can be avoided. This reduces the load from FEC packet generation and the load on networks.

Furthermore, the combination determination unit 107 determines combinations used to generate FEC packets according to the presence/absence of burst error. For example, the combination determination unit 107 determines that a burst error occurs when a number of the packets that are successively sent in error (i.e., the transmission fails) is greater than or equal to a predetermined number (e.g., three). Then the combination determination unit 107 generates FEC packets using combinations of data packets from different GOPs, for example, when it is determined that a receiving apparatus has sufficient buffer capacity, allowable delay time, and that a burst error has occurred.

In contrast, when determining that no burst error has occurred, for example, the combination determination unit 107 determines combinations of data packets so that FEC packets generated using data packets in a single frame recover the lost data packets.

According to the presence/absence of burst error, the combination determination unit 107 may determine whether to generate FEC packets using combinations of data packets from different GOPs.

For example, the combination determination unit 107 can determine combinations of data packets according to the frequency of occurrence of burst errors. The combination determination unit 107 determines that a burst error occurs when packets that are successively sent in error (i.e., the transmission fails) is greater than or equal to a predetermined number (e.g., three). In the case that the burst errors have occurred a predetermined number of times or more during a predetermined time, the combination determination unit 107 determines combinations of data packets so that FEC packets are generated using combinations of data packets from different GOPs.

In contrast, in cases where the burst errors have occurred less than a predetermined number of times during a predetermined time, the combination determination unit 107 determines, for example, combinations of data packets so that FEC packets are generated using combinations of data packets from one GOP (e.g., in one frame).

In addition, when it is determined to generate FEC packets using data packets from different GOPs, the combination determination unit 107 increases the interval between data packets used for the generation of FEC packets, for example, in the case that there are a particularly large number of packets that are successively missed (the transmission fails). Such a number of packets suggest that the network (transmission path 109) may be significantly congested and that a large number of burst errors may occur again.

Then the combination determination unit 107 determines if the network is significantly congested based on the number of the packets successively sent in error. When it is determined that the network is significantly congested, the combination determination unit 107 increases the interval between data packets used for the generation of FEC packets as compared to the case where there is no significant congestion on the network although burst errors occurs.

More specifically, the combination determination unit 107 in this exemplary embodiment determines that there is no significant congestion on the network although burst errors occur if the number of the packets successively sent in error is less than a predetermined number (e.g., twenty). In this case, the combination determination unit 107 generates FEC frames using combinations of I frames from two successive GOPs (GOP (n) and GOP (n+1)) for example. If the number of the packets sent successively in error is equal to or more than a predetermined number (e.g., twenty), the combination determination unit 107 determines that the network is seriously congested.

The combination determination unit 107 increases the interval between data packets used for the generation of FEC packets compared to the case where there is no significant congestion on the network when it is determined that the network is significantly congested and a receiving apparatus has sufficient buffer capacity and allowable delay time. In other words, the combination determination unit 107 generates FEC frames using combinations of I frames from two GOPs (GOP (n) and GOP (n+2)), for example, that are not successive in a reproduction order.

More specifically, first, the moving image coding unit 101 inputs data in a first frame (I frame in the GOP (n)), data in a second frame (I frame in GOP (n+1)), and data in a third frame (I frame in GOP (n+2). The first to third frames are reproduced in this order.

Then, the combination determination unit 107 determines the number of packets that are successively missed in transmission from among the data packets in frames before the first frame. Based on the result, the combination determination unit 107 determines combinations of data packets used to generate FEC packets. Accordingly, in cases where a first number of packets (e.g., nineteen) is successively missed in transmission, the error correction coding unit 106 generates FEC packets as follows. The error correction coding unit 106 generates recovery packets used to recover the lost data packets in the first frame based on the data packets in the first frame (I frame in GOP (n)) and the data packets in a second frame (I frame in GOP (n+1)).

In contrast, in cases where a second number of packets (e.g., twenty), which is larger than the first number, is successively missed in transmission, the error correction coding unit 106 generates FEC packets as follows. The error correction coding unit 106 generates recovery packets used to recover the lost data packets in the first frame based on the data packets in the first frame (I frame in GOP (n)) and the data packets in a third frame (I frame in the GOP (n+2)).

The combination determination unit 107, when it is determined to generate FEC packets using data packets from different GOPs, increases the interval between data packets used for the generation of FEC packets in the case where the frequency of occurrence of burst errors is particularly high. Such a high frequency of occurrence of burst errors suggests that there is significant congestion on the network. Thus, the combination determination unit 107 determines if there is significant congestion on the network based on a frequency of occurrence of burst errors.

When it is determined that there is significant congestion, the combination determination unit 107 increases the interval between data packets used for the generation of FEC packets as compared to the case where there is no significant congestion on the network although burst errors occur.

More specifically, the combination determination unit 107 in this exemplary embodiment determines that burst errors occur when the number of packets sent successively in error is greater than or equal to a predetermined number (e.g., three). Then, if the number of the occurrence is one during a predetermined period of time (e.g., the time for transmitting 100 packets) for example, the combination determination unit 107 determines that there is no significant congestion on the network although burst errors occur. In this case, the combination determination unit 107 generates FEC frames using combinations of I frame in two GOPs (GOP (n) and GOP (n+1)) that are transmitted, for example, successively.

In contrast, the combination determination unit 107 determines that there is significant congestion on the network if the number of the occurrence of burst errors is greater than or equal to a predetermined number (e.g., 10) during a predetermined period of time. Then the combination determination unit 107 increases the interval between data packets used for the generation of FEC packets as compared to the case where there is no significant congestion on the network when it is determined that the network is significantly congested and a receiving apparatus has sufficient buffer capacity and allowable delay time. In this case, the combination determination unit 107 generates FEC frames using combinations of I frames from two GOPs (GOP (n) and GOP (n+2)) that are, for example, not successive in the reproduction order.

The combination determination unit 107 in this exemplary embodiment determines combinations of data packets used to generate FEC packets based on information of a receiving apparatus such as buffer capacity, allowable delay time, and burst error that is provided by the receiving apparatus. The reception of the information will be described with reference to FIG. 13.

Figure 13:
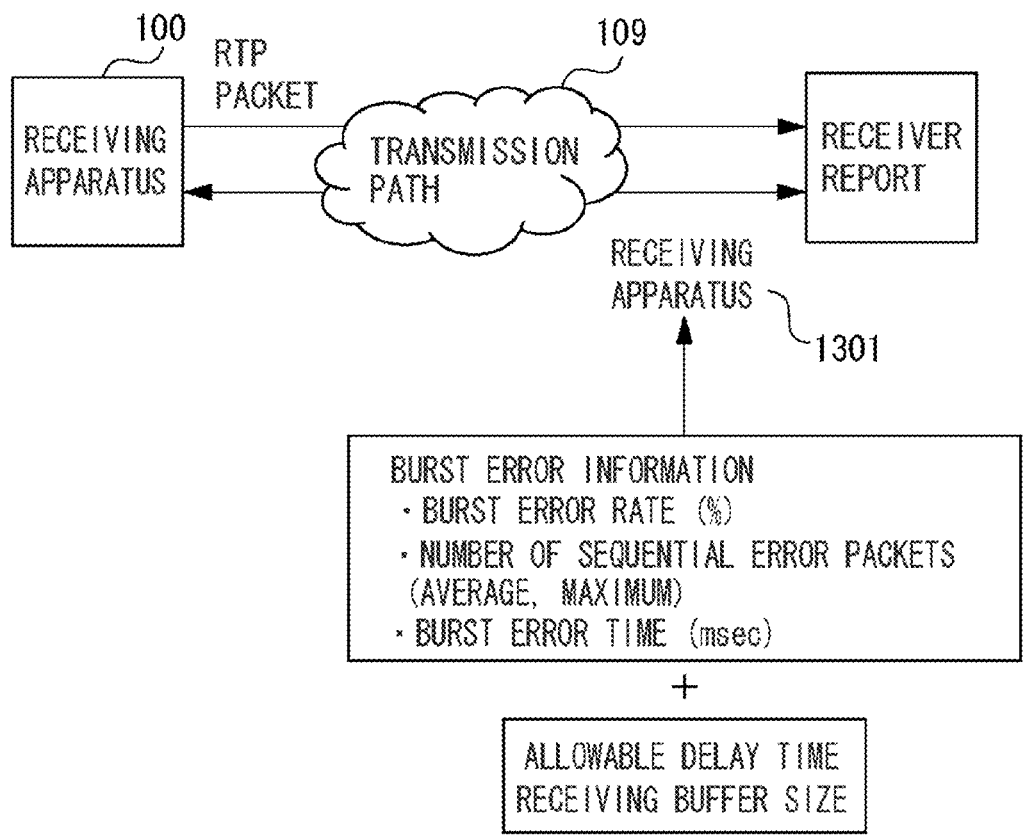
FIG. 13 illustrates data transmission between a transmission apparatus 100 and a receiving apparatus.

FIG. 13 illustrates data transmission between the transmission apparatus 100 and a receiving apparatus.

The transmission apparatus 100 transmits data packets and FEC packets via the transmission path 109 using RTP to the receiving apparatus. The receiving apparatus notifies a receiver report 1301 to the transmission apparatus 100. The report contains information about burst error and information on allowable delay time and buffer size.

The information about burst error contains, for example, the frequency of burst error, the number of packets successively sent in error in one burst error, the time of period for one burst error. When a predetermined number or more of packets is sent in error, the combination determination unit 107 determines occurrence of burst error.

For example, the receiver report 1301 contains information, such as the frequency (four times) of burst error that have occurred since a previous receiver report 1301 has been transmitted, the numbers of packets successively sent in error in each burst error (six, five, four, and nine), and the time of period for each burst error. The example contains all of the numbers of packets successively sent in error, but the maximum number (nine) or an average number (six) of packets successively sent in error may instead be contained.

The illustrated frequencies of burst errors is the number of the burst errors since a previous receiver report 1301 has been transmitted, but are not limited to the numbers, and may be a ratio of the packets sent in error, to the transmitted packets, for example. The receiver report may contain all of the above information or a part of the information about the burst errors. The transmission apparatus 100 determines combinations of data packets based on the information about burst errors included in the receiver reports 1301 that are regularly received.

The receiving apparatus notifies the information about allowable delay time and buffer size to the transmission apparatus 100 in a first receiver report 1301 unless particularly needed.

In RTP packet communication, as in this exemplary embodiment, RTP control protocol (RTCP) is used to obtain information about reception condition.

In RTCP, packets containing information are transmitted between a transmission apparatus and a receiving apparatus, and particularly, the packet notified from the receiving apparatus to the transmission apparatus is called receiver report as illustrated in FIG. 13. The receiver report typically contains information such as the numbers of accumulated lost packets and received packets, delay in time of packet transmission, and jitter.

A receiving apparatus in this exemplary embodiment stores information of buffer capacity thereof and information such as allowable delay time, and burst error into extended fields in a receiver report. Then, the combination determination unit 107 of the transmission apparatus 100 determines combinations of data packets used to generate FEC packets based on the information in the extended fields in a receiver report. The RTCP receiver report having extended report blocks can store unique information as in this exemplary embodiment.

For example, the combination determination unit 107 determines if a burst error has occurred by referring to the frequency of burst errors among the information about burst error. When an occurrence of burst error is determined, the combination determination unit 107 generates FEC packets using data packets from different GOPs, whereas, when it is not determined that a burst error occurs, the combination determination unit 107 generates FEC packets using data packets from one GOP.

The combination determination unit 107 can increase the interval between data packets used for the generation of FEC packets in cases where the frequency of burst errors is higher than a predetermined value, as compared to the case where the frequency of burst errors is lower than a predetermined value.

In addition, for example, the combination determination unit 107 determines if a burst error has occurred, by referring to the number of packets successively sent in error among the information about burst error. When it is determined that a burst error occurs, the combination determination unit 107 generates FEC packets using data packets from different GOPs, whereas, when it is not determined that a burst error occurs, the combination determination unit 107 generates FEC packets using data packets from one GOP.

Furthermore, the combination determination unit 107 can increase the interval between data packets used for the generation of FEC packets in cases where the number of packets successively sent in error is higher than a predetermined value, as compared to the case where the number of packets successively sent in error is lower than a predetermined value.

In the above description, FEC frames are generated similarly from all of the GOPs, but the generation of the FEP frames can be reduced.

For example, in cases that allowable delay time and buffer size are sufficient, the amount of transmitted data can be decreased by reducing the generation of the FEP frames. This reduces the amount of communication over communication path (transmission path 109).

An example of reduction in FEC frame generation will be described with reference to FIG. 14.

Figure 14:
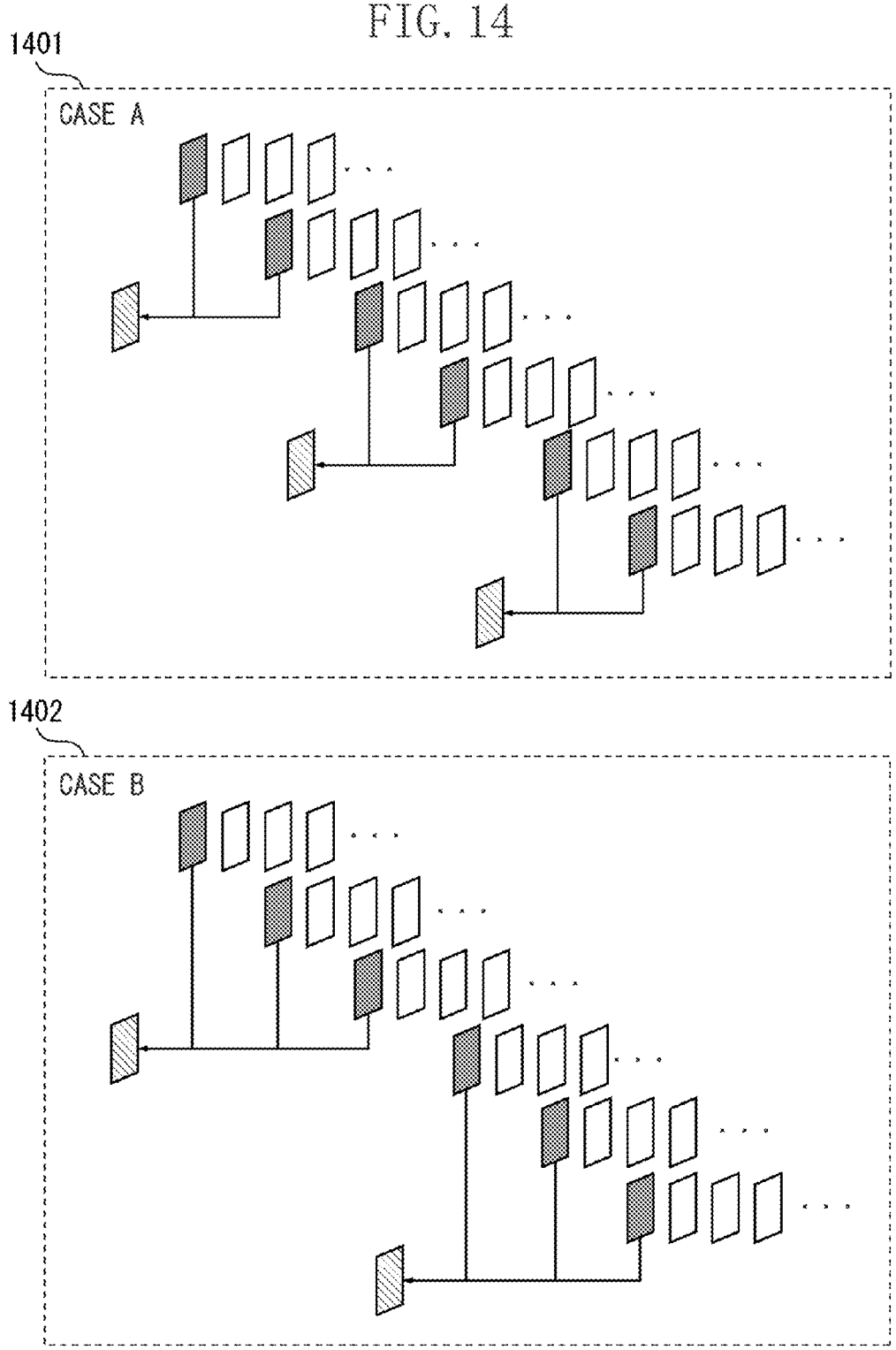
FIG. 14 illustrates examples for reducing the number of FEC frames to be generated.

In FIG. 14, Case A 1401 illustrates a case where an FEC frame is generated from every two GOPs. As illustrated in Case A 1401, the combination determination unit 107 generates FEC packets using both of the first and second GOPs, and FEC packets using both of the third and fourth GOPs. This reduces the number of resulting FEC packets as compared to the case where FEC packets are generated using both of the first and second GOPs, FEC packets using both of the second and third GOPs, and FEC packets using both of the third and fourth GOPs.

Case B 1402 illustrates a case where an FEC frame is generated from every three GOPs. This further reduces the number of resulting FEC packets When there is significant congestion on network, the reduction in the number of FEC packets prevents degradation in a congestion state.

However, as described above, the frequency of generation of FEC frames should be changed under careful consideration of allowable delay time and buffer capacity.

Figure 15:
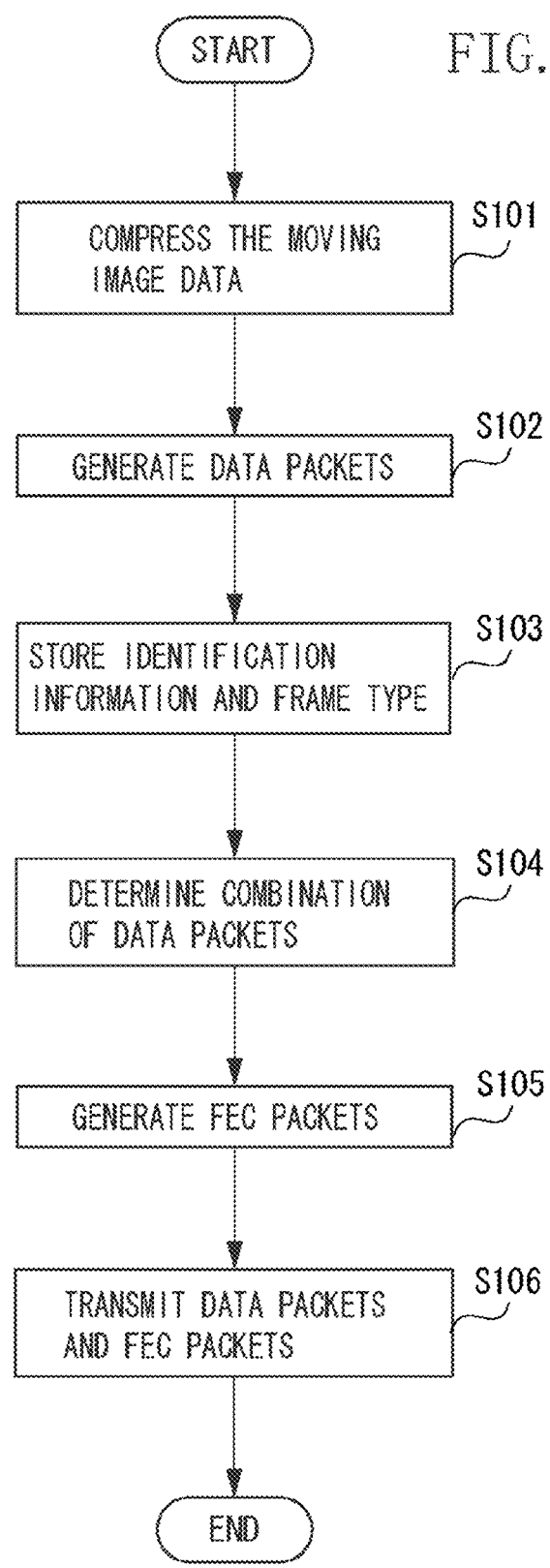
FIG. 15 illustrates operations of a transmission apparatus.

Next, the operations for generating FEC packet by the transmission apparatus 100 in this exemplary embodiment will be described with reference to the flowchart in FIG. 15.

In step S101, the moving image coding unit 101 compresses and codes the moving image data input from the video image input apparatus 108. Then the moving image coding unit 101 outputs the compressed and coded moving image data to the packet generation unit 102, and the processing goes to step S102.

In step S102, the packet generation unit 102 divides the compressed and coded moving image data into data segments of a size appropriate for communication, and attaches a header to each of the divided moving image data segments to generate data packets. The packet generation unit 102 stores the generated data packets into the packet storage unit 103, and the processing goes to step S103.

In step S103, the packet generation unit 102 stores the identification information (e.g., sequence number) and frame type of each of the data packets generated in step S102 into the frame type storage unit 105. The frame type storage unit 105 stores the identification information and frame types of each data packet therein, and the processing goes to step S104.

In step S104, the combination determination unit 107 determines combinations of data packets that are used to generate FEC packets based on the information about frame type of each data packet and the information contained in a receiver report sent from a receiving apparatus. In the determination, the combination determination unit 107 refers to the information contained in the receiver report from the receiving apparatus such as buffer capacity, allowable delay time, and burst error. The burst error information is contained in an extended field of the receiver report. In step S104, the combinations determined by the combination determination unit 107 are notified to the error correction coding unit 106, and the processing goes to step S105.

In step S105 (procedure for generation), the error correction coding unit 106 generates FEC packets based on the combinations of data packets determined by the combination determination unit 107. More specifically, in step S105, the error correction coding unit 106 generates recover packets (FEC packets) based on the data packets in a first frame and the data packets in a second frame. The generated FEC packets are used when a data packet in the first frame is missed in transmission to recover the missing data packet.

The error correction coding unit 106 in this exemplary embodiment generates FEC packets using combinations of data packets in frames of the same frame type. In step S105, the combination determination unit 107 determines a coding type (frame type) (procedure for determination). More specifically, the combination determination unit 107 determines a coding type of each frame which can decide if the frame can be coded without reference to other frame data (I frame) or with reference to other frame data (B and P frames). Then, the error correction coding unit 106 generates recover packets (FEC packets) based on the data packets in the second frame that has the same coding type as the first frame and the data packets in the first frame.

The error correction coding unit 106 extends the header of the FEC packets, as illustrated in FIG. 5, so that an FEC packets are generated. The packets include a sequence number of data packets that are separated by more than a predetermined number of packets. More specifically, in step S105, the error correction coding unit 106 generates recover packets that contain identification information of data packets in the first frame and identification information of data packets in the second frame. In this exemplary embodiment, the sequence numbers of the data packet A and the difference between the sequence numbers of the data packet A and other member are used as the identification information of data packets. The information, however, is not limited to these, and any information that identifies data packets used to generate FEC packets can be used.

The error correction coding unit 106 in this exemplary embodiment generates FEC packets by using combinations of data packets from different GOPs and combining data packets in frames that are successively transmitted.

More specifically, in step S105, the error correction coding unit 106 generates a first recover packet that is used by a receiving apparatus to recover a missing first data packet in a first frame based on a data packet in the first frame and a data packet in a second frame. The error correction coding unit 106 also generates a second recover packet that is used by a receiving apparatus to recover a missing first data packet in a first frame based on a first data packet in the first frame and a second data packet in a first frame.

Thus, the data packet that was lost due to burst error can be recovered by the FEC packet generated by the data packets from different GOPs, and the data packet that was lost due to a reason other than burst error can be recovered more rapidly by the recover packet generated by the data packets in one frame. The FEC packets generated by the error correction coding unit 106 are stored in the packet storage unit 103, and then the processing goes to step S106.

In step S106 (procedure for transmission), the packet transmission unit 104 reads the FEC packets generated by the error correction coding unit 106 from the packet storage unit 103 and sends the packets to the receiving apparatus. More specifically, in step S106, the packet transmission unit 104 transmits the data packets and the recover packets (FEC packets).

As described above, the combination determination unit 107 in this exemplary embodiment determines combinations of data packets used to generate FEC packets so that the FEC packets can be generated by the combinations of the data packets from different GOPs.

Thus, the data packet that was lost due to burst error can be recovered using the FEC packets generated by the data packets from different GOPs, for example. According to the present invention, the number of data packets that are lost and cannot be recovered by redundant data (FEC packets) can be reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-026377 filed Feb. 6, 2009, which is hereby incorporated by reference herein in its entirety.

What is claimed is:

1. A transmission apparatus configured to transmit data packets of moving image data to a receiving apparatus, the data packets constituting a plurality of frames of the moving image data, comprising:
   a generation unit configured to generate, based on data packets in a first frame of the moving image data and data packets in a second frame of the moving image data, a recover packet for recovering a data packet missed in transmission, the second frame having the same coding type as that of the first frame, wherein the coding type of a frame indicates whether data of the frame is coded without reference to other frame data; and
   a transmission unit configured to transmit the data packets and the recover packet.

2. The transmission apparatus according to claim 1, wherein the generation unit generates the recover packet containing identification information of the data packets in the first frame and identification information of the data packets in the second frame.

3. The transmission apparatus according to claim 1, further comprising an input unit configured to input data of the first frame, data of the second frame that is reproduced later than the data of the first frame, and data of a third frame that is reproduced later than the data of the second frame,
   wherein the generation unit generates, based on data packets in the first frame and data packets in the second frame, a recover packet for recovering the missing data packet in the first frame, and generates, based on data packets in the second frame and data packets in the third frame, a recover packet for recovering the missing data packet in the second frame.

4. The transmission apparatus according to claim 1, wherein the generation unit generates, based on a data packet in the first frame and a data packet in the second frame, a first recover packet for recovering a missing first data packet in the first frame, and generates, based on the first data packet in the first frame and a second data packet in the first frame, a second recover packet for recovering the first missing data packet in the first frame.

5. The transmission apparatus according to claim 1, further comprising an input unit configured to input data of the first frame, data of the second frame that is reproduced later than the data of the first frame, and data of the third frame that is reproduced later than the data of the second frame, and a determination unit configured to determine a number of successively missed data packets in frames transmitted before the first frame, wherein the generation unit generates, based on data packets in the first frame and data packets in the second frame, a recover packet for recovering data packets in the first frame when a first number of packets are successively missed in transmission, and generates, based on data packets in the first frame and data packets in the third frame, a recover packet for recovering data packets in the first frame, when a second number of packets are successively missed in transmission, the second number greater than the first number.

6. The transmission apparatus according to claim 1, further comprising an input unit configured to input data of the first frame, data of the second frame that is reproduced later than the data of the first frame, and data of the third frame that is reproduced later than the data of the second frame, wherein the generation unit generates, based on the data packets in the first frame and the data packets in the second frame, a recover packet for recovering data packets in the first frame when there is a first difference between a transmission time and a reproduction time of data packets in the first frame, and generates, based on data packets in the first frame and data packets in the third frame, a recover packet for recovering data packets in the first frame when there is a second difference between a transmission time and a reproduction time of data packets in the first frame, the second difference being longer than the first difference.

7. A method implemented by a transmission apparatus configured to transmit data packets of moving image data to a receiving apparatus, the data packets constituting a plurality of frames of the divided moving image data, the method comprising:

generating, based on data packets in a first frame of the moving image data and data packets in a second frame of the moving image data, a recover packet for recovering a data packet missed in transmission, the second frame having the same coding type as that of the first frame, wherein the coding type of a frame indicates whether data of the frame is coded without reference to other frame data; and transmitting the data packets and the recover packet.

8. The method according to claim 7, further comprising generating the recover packet containing identification information of the data packets in the first frame and identification information of the data packets in the second frame.

9. The method according to claim 7, further comprising inputting data of the first frame, data of the second frame that is reproduced later than the data of the first frame, and data of a third frame that is reproduced later than the data of the second frame, wherein, a recover packet for recovering the missing data packet in the first frame is generated based on data packets in the first frame and data packets in the second frame, and a recover packet for recovering the missing data packet in the second frame is generated based on data packets in the second frame and data packets in the third frame.

10. The method according to claim 7, wherein, a first recover packet for recovering a missing first data packet in the first frame is generated based on a first data packet in the first frame and a data packet in the second frame, and a second recover packet for recovering the first missing data packet in the first frame is generated based on the first data packet in the first frame and a second data packet in the first frame.

11. The method according to claim 7, further comprising inputting data of the first frame, data of the second frame that is reproduced later than the data of the first frame, and data of the third frame that is reproduced later than the data of the second frame; and determining a number of successively missed data packets in the frames transmitted before the first frame, wherein, recover packets for recovering data packets in the first frame are generated based on data packets in the first frame and data packets in the second frame, when a first number of packets are successively missed in transmission, and recover packets for recovering data packets in the first frame are generated based on data packet in the first frame and data packets in the third frame, when a second number of packets are successively missed in transmission, the second number being greater than the first number.

12. A non-transitory computer-readable storage medium that stores computer-executable instructions for transmitting data packets of moving image data to a receiving apparatus, the data packets constituting a plurality of frames of the moving image data, the medium comprising:

computer-executable instructions for generating, based on data packets in a first frame of the moving image data and data packets in a second frame of the moving image data, a recover packet for recovering data packet missed in transmission, the second frame having the same coding type as that of the first frame, wherein the coding type of a frame indicates whether data of the frame is coded without reference to other frame data; and computer-executable instructions for transmitting the data packets and the recover packet.

13. The non-transitory computer-readable storage medium according to claim 12, further comprising computer-executable instructions for generating the recover packet containing identification information of data packets in the first frame and identification information of data packets in the second frame.

14. The non-transitory computer-readable storage medium according to claim 12, further comprising computer-executable instructions for inputting data of the first frame, data of the second frame that is reproduced later than the data of the first frame, and data of a third frame that is reproduced later than the data of the second frame, wherein, a recover packet for recovering the missing data packet in the first frame is generated based on data packets in the first frame and data packets in the second frame, and a recover packet for recovering the missing data packet in the second frame is generated based on data packets in the second frame and data packets in the third frame.

15. The non-transitory computer-readable storage medium according to claim 12, wherein, a first recover packet for recovering missing first data packet in the first frame is generated based on a first data packet in the first frame and a data packet in the second frame, and a second recover packet for recovering the missing first data packet in the first frame is generated based on the first data packet in the first frame and a second data packet in the first frame.

16. The non-transitory computer-readable storage medium according to claim 12, further comprising:
  computer-executable instructions for inputting data of the first frame, data of the second frame that is reproduced later than the data of the first frame, and data of the third frame that is reproduced later than the data of the second frame; and
  computer-executable instructions for determining a number of successively missed data packets in the frames transmitted before the first frame,
  wherein, recover packets for recovering data packets in the first frame are generated based on data packets in the first frame and data packets in the second frame, when a first number of packets are successively missed in transmission, and recover packets for recovering data packets in the first frame is generated based on data packet in the first frame and data packets in the third frame, when a second number of packets are successively missed in transmission, the second number being greater than the first number.

17. A transmission apparatus configured to transmit data packets of moving image data to a receiving apparatus, the data packets constituting a plurality of frames of the moving image data, comprising:
  a generation unit configured to generate, based on a first data packet at a first position in the first frame of the moving image data and a second data packet at a second position corresponding to the first position in a second frame of the moving image data, a recover packet for recovering the first data packet missed in transmission, the recover packet being used when the first data packet corresponding to a first position in a first frame is missed in transmission; and
  a transmission unit configured to transmit the data packets and the recover packet.

18. A method implemented by a transmission apparatus configured to transmit data packets of moving image data to a receiving apparatus, the data packets constituting a plurality of frames of the moving image data, the method comprising:
  generating, based on a first data packet at a first position in the first frame of the moving image data and a second data packet at a second position corresponding to the first position in a second frame of the moving image data, a recover packet for recovering the first data packet missed in transmission, the recover packet being used when the first data packet corresponding to a first position in a first frame is missed in transmission; and
  a transmitting the data packets and the recover packet.

19. A non-transitory computer-readable storage medium that stores computer-executable instructions for transmitting data packets of moving image data to a receiving apparatus, the data packets constituting a plurality of frames of the moving image data, the medium comprising:
  computer-executable instructions for generating, based on a first data packet at a first position in the first frame of the moving image data and a second data packet at a second position corresponding to the first position in a second frame of the moving image data, recover packet for recovering the first data packet missed in transmission, the recover packet being used when the first data packet corresponding to a first position in a first frame is missed in transmission; and
  transmitting the data packets and the recover packet.

* * * * *